3,646,029
PIPERAZINO METHYL 1,3 DIARYLGUANDINES
Darrell Dexter Mullins, Nitro, W. Va., assignor to
Monsanto Company, St. Louis, Mo.
No Drawing. Filed Sept. 25, 1968, Ser. No. 762,608
Int. Cl. C07d 51/70
U.S. Cl. 260—268 R    6 Claims

ABSTRACT OF THE DISCLOSURE

Compounds of the formula

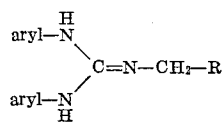

where R is hydroxy, halogen, amino, nitroalkyl, or N-arylcarbamoyloxy are described which are useful for control of soil borne pathogenic organisms which attack the underground parts of plants.

---

The present invention relates to 2-hydroxymethyl-1,3-diarylguanidines and derivatives thereof and particularly to 2-aminomethyl-1,3-diarylguanidine.

The 2-hydroxymethyl-1,3-diarylguanidines are stable solids which can be isolated and stored indefinitely at ordinary temperatures. However, it is often more convenient to form them in situ when they are required simply as transient intermediates. They are very reactive intermediates and condense readily with primary and secondary amines to form 2 - aminomethyl-1,3-diarylguanidines. Representative amines are aniline, toluidine, 3,4 - dichloroaniline, p-nitroaniline, m-chloroaniline, methylamine, ethylamine, diethylamine, dimethylamine, propylamine, dipropylamine, isopropylamine, diisopropylamine, butylamine, dibutylamine, pyrrolidine, piperazine, piperidine, morpholine, hexamethylenimine, heptamethylenimine, octamethylenimine, N-2-hydroxyethylpiperazine, and N-methylpiperazine. Condensation takes place with other compounds having active hydrogen, for example the nitroalkanes, which yield 2 - nitroalkyl-1,3-diarylguanidine. Reaction with arylisocyanates yields esters of N-aryl carbamic acids.

The compounds of the present invention possess the formula

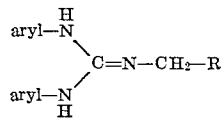

where R is hydroxy, chloro, bromo, fluoro, iodod, amino, nitroalkyl, or N-arylcarbamoyloxy. Examples of aryl are phenyl, m-chlorophenyl, p-chlorophenyl, o-chlorophenyl, o-ethylphenyl, o-tolyl, m-tolyl, p-tolyl, 3,4-xylyl, 2,6-xylyl, 2,4-xylyl, p-tert-butylphenyl, 3,4-dichlorophenyl, 2,6- dichlorophenyl, and p-nitrophenyl. The new guanidines are useful for the control of soil borne pathogenic organisms which attack the underground parts of plants.

Diphenylguanidine was described by Weiss, U.S. 1,422,506 (1922) and di(p-xylyl)guanidine was described by Scott, U.S. 1,642,180 (1927). Di(p-nitrophenyl)-guanidine, di(m-xylyl)guanidine, di(o-xylyl)guanidine, and di(monochlorophenyl)guanidine were described by Naunton, Chemical Abstracts 21, p. 672 (1927). Bis(3,4-dichlorophenyl)guanidine was described by Johary et al., Chemical Abstracts 48, 2629$^d$ (1954). Di(orthoethylphenyl)guanidine was described by Beaver, U.S. 2,633,474 (1953) and di(p-tert.butylphenyl)guanidine by Pahl, Ber. 17, page 1240 (1884).

The following examples illustrate the preparation of compounds in which R is chloro, hydroxy, 2-nitro-2-propyl, 3,4 - dichlorocarbaniloyloxy, 1 - piperazinyl, 4-methyl - 1 - piperazinyl, 4 - (2-hydroxyethyl)-1-piperazinyl, or morpholino but are not to be taken as limitative.

EXAMPLE 1

To a stirred slurry comprising 53.0 grams (0.25 mole) of 1,3-diphenylguanidine, 2 grams of sodium carbonate, 22.5 grams (0.25 mole) of 37% formaldehyde, and 250 ml. of water, at 95°–100° C., was added dropwise in 20 minutes 25.7 grams (0.25 mole) of N-methylpiperazine. After stirring the reaction mixture at 95°–100° C. for 12 hours, it was cooled to 0°–5° C., filtered, and the filter cake washed with water. The precipitate was air-dried at room temperature. 2-(4-methyl-1-piperazinylmethyl)-1,3-diphenylguanidine was obtained in 74.4% yield as a white solid. After recrystallization from ethanol, it melted at 149°–150° C. Analysis gave 21.90% nitrogen compared to 21.66% calculated for $C_{19}H_{25}N_5$.

EXAMPLE 2

To a stirred slurry prepared as described in Example 1, at 95°–100° C., was added dropwise in 15 minutes 21.7 grams (0.25 mole) of morpholine. The reaction mixture was stirred at 95°–100° C. for 6 hours, cooled to 0°–5° C. and filtered. The filter cake was washed with water, slurred in 200 ml. of ether, and filtered. The resultant solid was air-dried at room temperature. 2-(morpholinomethyl) - 1,3-diphenylguanidine was obtained in 81.2% yield as a white solid. After recrystallization from ethanol, it melted at 143°–145° C. Analysis gave 17.97% nitrogen compared to 18.05% calculated for $C_{18}H_{22}N_4O$.

EXAMPLE 3

To a stirred slurry comprising 53.0 grams (0.25 mole) of 1,3-diphenylguanidine, 22.5 grams (0.25 mole) of 37% formaldehyde, and 100 ml. of ethyl alcohol, at 75°–80° C., was added in one portion 21.53 grams (0.25 mole) of anhydrous piperazine. The reaction mixture was heated at refluxing temperature for 12 hours, cooled to 0°–5° C., filtered, and washed with 150 ml. of water. The filter cake was then air-dried at room temperature. 1,3-diphenyl-2-(1-piperazinylmethyl)guanidine was obtained in 84% yield as a white solid melting at 162°–165° C. Analysis gave 22.45% nitrogen compared to 22.64% calculated for $C_{18}H_{23}N_5$.

EXAMPLE 4

To a stirred slurry prepared as described in Example 3, at 75°–80° C., was added in small increments, in 30 minutes, 28.55 grams (0.25 mole) of 4-(2-hydroxyethyl)-1-piperazine. After heating at refluxing temperature for 6 hours, the product was cooled and poured into 800 ml. of ice water. A viscous semi-solid resulted. This was extracted with 400 ml. of ether, dried over sodium sulfate, and the ether removed in vacuo. 2-[2-(2-hydroxyethyl)-1-piperazinylmethyl]-1,3-diphenylguanidine was obtained in 41% yield as a tan solid melting at 48°–55° C. Analysis gave 19.13% nitrogen compared to 19.85% calculated for $C_{20}H_{27}N_5O$.

If desired, the intermediate 2-(hydroxymethyl)-1,3-diphenylguanidine may be isolated for further reaction. A slurry was prepared comprising 105.6 grams (0.5 mole) of 1,3-diphenylguanidine, 300 ml. of water, 2 grams of sodium carbonate, and 45 grams (0.5 mole) of 37% formaldehyde. The slurry was heated at refluxing temperature (95°–100° C.) for 3 hours, then cooled to 0°–5° C., filtered, washed with 250 ml. of water and 100 ml. of heptane, and air-dried at room temperature. 2-(hydroxymethyl)-1,3-diphenylguanidine was obtained in 99% yield as a grey solid melting at 80°–85° C. Analysis gave 17.51% nitrogen compared to 17.42% calculated for $C_{14}H_{15}N_3O$.

EXAMPLE 5

To a stirred slurry comprising 48.2 grams (0.2 mole) of 2-(hydroxymethyl)-1,3-diphenylguanidine, prepared as described, and 300 ml. of benzene, at 0°–5° C. was added dropwise in 45 minutes, 23.8 grams (0.22 mole) of thionyl chloride. The reaction temperature was allowed to rise to room temperature, then the reaction mixture was heated at refluxing temperature for 4 hours, cooled to 0°–5° C., and filtered. The filter cake was washed with 200 ml. of ether and air-dried at room temperature to obtain 2-(chloromethyl)-1,3-diphenylguanidine in 96.5% yield as a yellow solid. After recrystallization from alcohol, it melted at 173°–175° C. Analysis gave 15.90% nitrogen and 13.43% chlorine compared to 16.21% nitrogen and 13.68% chlorine calculated for $C_{14}H_{14}N_3Cl$.

EXAMPLE 6

A slurry comprising 48.2 grams (0.2 mole) of 2-(hydroxymethyl)-1,3-diphenylguanidine, 300 ml. of heptane, and 34.8 grams (0.2 mole) of 3,4-dichlorophenyl isocyanate was heated at refluxing temperature for 18 hours, cooled, filtered, and washed with heptane. The product was air-dried at room temperature. [(Dianilinomethylene)amino]methyl-3,4-dichlorocarbanilate was obtained in 91% yield as a tan solid melting at 47°–53° C. Analysis gave 12.31% nitrogen and 15.06% chlorine compared to 13.08% nitrogen and 16.56% chlorine calculated for $C_{21}H_{18}Cl_2N_4O_2$.

EXAMPLE 7

To a stirred slurry comprising 53.0 grams (0.2 mole) of 1,3-diphenylguanidine, 200 ml. of methanol, 10 ml. of triethylamine, and 22.5 grams (0.25 mole) of 2-nitropropane, at refluxing temperature, was added dropwise in an hour, 22.5 grams (0.25 mole) of 37% formaldehyde. Heating at refluxing temperature was continued for 30 minutes. On cooling to 0°–5° C. no solid separated, so the reaction was stripped in vacuo to remove the alcohol. 2-(2-methyl-2-nitropropyl)-1,3-diphenylguanidine was obtained in 70.5% yield as a viscous brown oil. Analysis gave 17.53% nitrogen compared to a calculated value (Dumas) of 17.94% for $C_{17}H_{20}N_4O_2$.

The new compounds destroy pathogenic organisms in soil at rates of 30–100 p.p.m.[1] in infested soil. Activity was demonstrated against "damping-off" fungi. Those present were principally Pythium, Rhizoctonia, and Fusarium species. A stock solution of the test material was pipetted into a glass jar containing one pound of infested soil. The jar was sealed and the contents thoroughly mixed by vigorous shaking. The treated soil was incubated at room temperature for 24 hours, transferred to clay pots, and 15 seeds of each of two crop plants sown in each pot. The seeds planted were Delta Pine No. 15 cotton and Straight Eight cucumber. The seeded pots were then incubated at 70° F. at 98% humidity to insure activity of the organisms in the soil. After 24 hours, the pots were removed to a greenhouse and disease assessments made within 10–14 days. The percent emergence and disease incidence were noted and ratings recorded. The ratings were based on inoculated, untreated, and uninoculated, sterile soil treatments. For convenience in recording the data, the following rating scale was used:

Rating:                       Healthy plants out of 30
E ------------------------------------- 26–30
P ------------------------------------- 19–25
F ------------------------------------- 13–18
N, not effective ---------------------- <13

[1] Parts per million of toxicant in the soil.

The results are recorded below:

TABLE I

| Toxicant | Concentration, p.p.m. | Soil fungicide rating |
|---|---|---|
| 2-(4-methyl-1-piperazinylmethyl)-1,3-diphenylguanidine | 110<br>30 | E<br>P |
| 2-(morpholinomethyl)-1,3-diphenylguanidine | 30 | P |
| 1,3-diphenyl-2-(1-piperazinylmethyl)-guanidine | 30 | P |
| 2-(chloromethyl)-1,3-diphenylguanidine | 100 | P |
| 2-[4-(2-hydroxyethyl)-1-piperazinylmethyl]-1,3-diphenylguanidine | 30 | F |
| [(Dianilinomethylene)amino]-methyl-3,4-dichlorocarbanilate | 100 | E |

The foregoing demonstrate that the compounds are effective against "damping-off" fungi. Application of the test chemical in toxic quantities may be in any suitable fashion. The active ingredients are insoluble in water but are soluble or slightly soluble in benzene. They may be dispersed in water with the aid of a dispersing agent to form a concentrate which is subsequently diluted with water to form a spray suitable for application. Alternatively, the test chemical may be admixed with an inert solid diluent such as talc, diatomaceous earth, fuller's earth, etc., to form dry compositions which can be employed as such in the form of dusts or which can be dispersed in an aqueous medium to form a liquid spray.

It is intended to cover all changes and modifications of the examples of the invention herein chosen for purposes of disclosure which do not constitute departures from the spirit and scope of the invention.

What is claimed is:

1. A compound of the formula

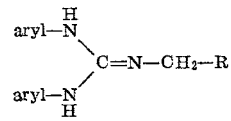

where R is amino selected from the group consisting of 1-piperazinyl, 4-methyl-1-piperazinyl, and 4-(2-hydroxyethyl)-1-piperazinyl and the aryl groups are identical aryl being phenyl optionally substituted by a single nitro, one or two chloro or one or two lower alkyl substituents.

2. A compound of claim 1 where aryl is selected from the group consisting of phenyl, m-chlorophenyl, 3,4-dichlorophenyl, o-ethylphenyl, o-tolyl, m-tolyl, p-tolyl, and xylyl and R is selected from the group consisting of 1-piperazinyl, 4-methyl-1-piperazinyl and 4-(2-hydroxyethyl)-1-piperazinyl.

3. A compound of the formula

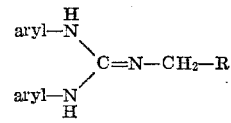

where aryl is identically selected from the group consisting of phenyl, p-nitrophenyl, monochlorophenyl, dichlorophenyl, mono(lower alkyl)phenyl and xylyl and R is amino selected from the group consisting of 1-piperazinyl, 4-methyl-1-piperazinyl and 4-(2-hydroxyethyl)-1-piperazinyl.

4. The compound of claim 3 where aryl is phenyl and R is 1-piperazinyl.

5. The compound of claim 3 where aryl is phenyl and R is 4-methyl-1-piperazinyl.

6. The compound of claim 3 where aryl is phenyl and R is 4-(2-hydroxyethyl)-1-piperazinyl.

References Cited

UNITED STATES PATENTS

| | | | |
|---|---|---|---|
| 2,362,915 | 11/1944 | Magregor | 260—564 X |
| 1,953,494 | 4/1934 | Meis | 260—565 |
| 2,205,789 | 6/1940 | Christman | 260—564 X |
| 2,412,984 | 12/1946 | Hill | 260—565 |
| 2,615,045 | 10/1952 | Kaiser | 260—565 |
| 2,633,474 | 3/1953 | Beaver | 260—565 |
| 3,113,151 | 12/1963 | McKay et al. | 260—564 |
| 3,117,994 | 1/1964 | McKay et al. | 260—564 |
| 3,168,562 | 2/1965 | Walton et al. | 260—564 |
| 3,248,426 | 4/1966 | Dvornik | 260—564 |
| 3,406,170 | 10/1968 | Papa | 260—268 X |
| 3,098,066 | 7/1963 | Mull | 260—268 |

DONALD G. DAUS, Primary Examiner

U.S. Cl. X.R.

260—239 B, 247.5, 293 D, 326.86, 471 R, 564 A, 565, 999